United States Patent [19]

Rabipour et al.

[11] Patent Number: 5,577,117
[45] Date of Patent: Nov. 19, 1996

[54] METHODS AND APPARATUS FOR ESTIMATING AND ADJUSTING THE FREQUENCY RESPONSE OF TELECOMMUNICATIONS CHANNELS

[75] Inventors: Rafi Rabipour, Cote St. Luc, Canada; Vasu Iyengar, Whitehall, Pa.

[73] Assignee: Northern Telecom Limited, Montreal, Canada

[21] Appl. No.: 257,129

[22] Filed: Jun. 9, 1994

[51] Int. Cl.$^6$ .................................................. H04R 29/00
[52] U.S. Cl. .......................... 379/414; 379/386; 379/237; 379/400; 379/351
[58] Field of Search .................................... 379/414, 386, 379/351, 237, 410, 406, 409, 400; 381/47, 38, 49, 102, 103; 364/485, 484

[56] References Cited

U.S. PATENT DOCUMENTS

| | | | |
|---|---|---|---|
| 3,649,765 | 3/1972 | Rabiner et al. | 381/46 |
| 3,808,370 | 4/1974 | Jackson et al. | 381/41 |
| 4,061,878 | 12/1977 | Adoul et al. | 381/39 |
| 4,091,237 | 5/1978 | Wolnowsky et al. | 381/49 |
| 4,797,931 | 1/1989 | Furukawa et al. | 364/484 |
| 4,847,885 | 7/1989 | Vittorelli | 379/6 |
| 4,852,169 | 7/1989 | Veeneman et al. | 381/38 |
| 5,195,132 | 3/1993 | Bowker et al. | 379/410 |
| 5,197,113 | 3/1993 | Mumolo | 395/2 |
| 5,216,747 | 6/1993 | Hardwick et al. | 395/2 |
| 5,280,525 | 1/1994 | Wesel | 379/400 |

OTHER PUBLICATIONS

A Pattern Recognition Approach To Voiced-Unvoiced-Silence Classification With Applications To Speech Recognition.
Bishnu S. Atal, IEEE and Lawrence R.Rabiner IEEE Jun. 3, 1976.
Atal et al., "A Pattern Recognition Approach to Voiced-Unvoiced-Silence Classification With Applications to Speech Recognition", *IEEE Transactions on Acoustics, Speech, and Signal Processing*, vol. ASSP-24, No. 3, pp. 201–212, (1976).

*Primary Examiner*—Jeffery Hofsass
*Assistant Examiner*—Jacques M. Saint-Surin
*Attorney, Agent, or Firm*—Foley & Lardner

[57] ABSTRACT

In methods and apparatus for estimating the frequency response of telecommunications channels, signals carried on the channels are divided into pluralities of signal segments of limited duration, unvoiced signal segments are identified, and spectral components of the unvoiced signal segments are measured. The measured spectral components may be integrated over time to derive time-averaged measurements of the spectral components. The time-averaged measurements may be compared to corresponding components of expected unvoiced signal spectra to improve the accuracy of the frequency response estimates. Filters may be inserted in the channels to adjust the frequency responses, the filters having filter characteristics selected in response to the measured spectral components. The methods and apparatus can be used to compensate for poor bass frequency response in voice channels.

22 Claims, 2 Drawing Sheets

METHODS AND APPARATUS FOR ESTIMATING AND ADJUSTING THE FREQUENCY RESPONSE OF TELECOMMUNICATIONS CHANNELS

FIELD OF INVENTION

This invention relates to methods and apparatus for estimating and adjusting the frequency response of telecommunications channels, and is particularly applicable to estimating and adjusting the frequency response of voice channels in telecommunications networks.

BACKGROUND OF INVENTION

Many telephone station sets and telephone networks are designed to transmit voice signal spectral components at frequencies greater than about 300 Hz with greater efficiency than spectral components below about 300 Hz. The resulting attenuation of spectral components below about 300 Hz can degrade the perceived quality of voice signals transmitted from such telephone sets over telephone networks to other telephone sets.

U.S. Pat. No. 5,195,132 discloses methods for preferentially amplifying voice signal spectral components between about 100 Hz and about 300 Hz in a telephone network in an effort to compensate for the low efficiency of many telephone transmitters in this frequency range. The preferential amplification is implemented by suitable programming of digital signal processors of echo cancellation circuitry provided at toll offices of the telecommunications network. (U.S. Pat. No. 5,195,132 issued Mar. 16, 1993 in the names of D. O. Bowker et al, and is entitled "Telephone Network Speech Signal Enhancement". The entire specification of this patent is hereby incorporated by reference.)

Unfortunately, the indiscriminate application of such preferential amplification to all signals regardless of their source may degrade the quality of some signals rather than enhancing it. For example, voice signals transmitted by telephone sets having relatively high efficiency for spectral components below 300 Hz will be overcompensated with a resulting degradation in signal quality.

U.S. Pat. No. 4,847,885 discloses a system for measuring and automatically compensating for distortions caused by a connection between a telephone station set and a central voice processing unit, such as a voice-mail system. The system comprises a sound source for producing reference sounds, an acoustic coupler for coupling the reference sounds to a telephone set for transmission to the central voice processing unit via a communications path, a sound analyzer coupled to the voice processing unit for spectrum analyzing sounds received at the central voice processing unit, a memory storing spectra of the reference sounds, and a processor for comparing the spectra of the received sounds to corresponding spectra of reference sounds. The comparison of received spectra to reference spectra permits computation of distortions caused by the telephone set and communications path. The processor then automatically compensates for distortion caused by the telephone set and communications path in processing speech received over the telephone connection. (U.S. Pat. No. 4,847,885 issued Jul. 11, 1989 in the name of V. Vittorelli, and is entitled "System for Measuring and Automatically Compensating for the Distortions of a Connection Between a Telephone Apparatus and a Central Voice Processing Unit".)

Unfortunately, the system disclosed in U.S. Pat. No. 4,847,885 requires portable units for acoustically coupling reference sounds into telephone sets. Compensation is available only to callers having such portable units, and those callers must take the time to use the units to couple reference sounds into the telephone sets at the beginning of each call. The callers must take care to properly position the portable units relative to the telephone set microphones to get good results. Consequently, the system disclosed in U.S. Pat. No. 4,847,885 is relatively expensive to implement and cumbersome for callers to use.

SUMMARY OF INVENTION

An object of one aspect of this invention is to provide methods and apparatus for estimating the frequency response of telecommunications channels which are simpler and faster than those disclosed in U.S. Pat. No. 4,847,885 so that compensation can be provided on a per call basis.

An object of another aspect of this invention is to provide methods and apparatus for automatically compensating for spectral deficiencies of telecommunications channels only when such compensation is warranted.

An object of yet another aspect of this invention is to provide methods and apparatus for automatically compensating for spectral deficiencies of telecommunications channels on a per call basis by applying compensation which is selected in accordance with measured spectral characteristics of the telecommunications channels.

One aspect of this invention provides a method for estimating a frequency response of a telecommunications channel. The method comprises dividing a signal carried on the channel into a plurality of signal segments of limited duration, identifying unvoiced signal segments, and measuring spectral components of the unvoiced signal segments.

Preferably, the measured spectral components are integrated over time to derive time-averaged measurements of the spectral components, and the time-averaged measurements of the spectral components are compared to corresponding components of an expected unvoiced signal spectrum to derive the estimated frequency response.

This method can be performed automatically on a per call basis to assess deficiencies in the frequency response of a telecommunications channel shortly after it has been established. Consequently, this method can be used to determine whether compensation of the channel is warranted, and to determine the nature of any compensation that should be provided.

The frequency response of the telecommunications channel may then be adjusted by inserting a filter in the channel, the filter having filter characteristics selected in response to the measured spectral components.

Because compensation can be applied only when warranted, and the nature of the compensation can be tailored to the measured frequency response of the telecommunications channel, this method can be used to avoid degrading signals transmitted over the channel by overcompensating for deficiencies of the channel.

Moreover, this method can be applied to live telephone calls without either party to the call having to perform any action to cause its application. Indeed, neither party to the call need even be aware that the frequency response of the voice channel is being adjusted, and the frequency response of the channel can be adjusted dynamically throughout the call if the frequency response of the channel changes during the call.

Another aspect of the invention provides apparatus for estimating a frequency response of a telecommunications channel. The apparatus comprises a signal framer, an unvoiced signal detector and a spectrum analyzer. The signal framer divides a signal carried on the channel into a plurality of signal segments of limited duration. The unvoiced signal detector identifies unvoiced signal segments. The spectrum analyzer measures spectral components of the unvoiced signal segments.

The spectrum analyzer may comprise a plurality of band limited power estimators and a plurality of integrators. Each power estimator may be operable to estimate signal power in a corresponding frequency band, and each integrator may be connected to a corresponding power estimator and operable to integrate signal powers estimated by the corresponding power estimator. The unvoiced signal detector may be operably connected to the spectrum analyzer to control the spectrum analyzer such that the integrators integrate estimated signal powers of only unvoiced signal segments.

The apparatus may further comprise a filter selector for selecting filter characteristics in response to the measured spectral components, and a filter for insertion into the telecommunications channel in response to control signals issued by the filter selector. The filter may be programmable, having filter characteristics selectable in response to control signals issued by the filter selector.

In the field of speech processing, the term "voiced signal" refers to signals which are primarily composed of the harmonics of a single fundamental frequency or a small number of fundamental frequencies. "Voiced signals" are distinguished from "unvoiced signals" which have wideband noise-like frequency spectra not dominated by harmonics of fundamental frequencies. Most spoken sounds produce "voiced" speech signals, but a few (for example the sounds associated with "s", "f", "sh" and "th") will produce "unvoiced" speech signals.

Some speech processing applications require that unvoiced speech signal segments be distinguished from voiced speech signal segments. Unvoiced signal detectors suitable for this purpose are known in the art of speech processing. Some examples are described in B. S. Atal et al, "A Pattern Recognition Approach to voiced-Unvoiced-Silence Classification with Applications to Speech Recognition", IEEE Trans. on ASSP, June 1976; in U.S. Pat. No. 5,197,113 issued Mar. 23, 1993 in the name of E. Mumolo and entitled "Method and Arrangement for Distinguishing Between Voiced and Unvoiced Speech Elements"; and in U.S. Pat. No. 5,216,747 issued Jun. 1, 1993 in the names of J. C. Hardwick et al and entitled "Voiced/Unvoiced Estimation of an Acoustic Signal". These publications are hereby incorporated by reference into this patent specification.

In practice, unvoiced signal detectors will generally classify signal segments containing signals other than speech (for example DTMF tones, supervisory signals, data signals, etc.) as "voiced signals" because their spectra are dominated by a few distinct frequencies. Moreover, unvoiced signal detectors will generally classify signal segments corresponding to silence intervals as "unvoiced signals" because of the wideband noise occupying such silence intervals.

In the preceding discussion of the invention and throughout this patent specification, the term "unvoiced signal" refers to signals which could be identified as unvoiced signals by unvoiced signal detectors. Such "unvoiced signals" and "unvoiced signal segments" may include unvoiced speech signals, wideband noise signals or other signals having wideband noise-like frequency spectra, or combinations of such signals. The term "voiced signal" refers to signals which could be identified as voiced signals by unvoiced signal detectors, including voiced speech signals, most data signals and most supervisory signals.

BRIEF DESCRIPTION OF DRAWINGS

Embodiments of the invention are described below by way of example only. Reference is made to accompanying drawings in which:

FIG. 2A shows an expected unvoiced signal spectrum; FIG. 2B shows a measured unvoiced signal spectrum; FIG. 2C shows an estimated frequency response and FIG. 2D shows the selected frequency characteristic.

DETAILED DESCRIPTION

Figure 1:
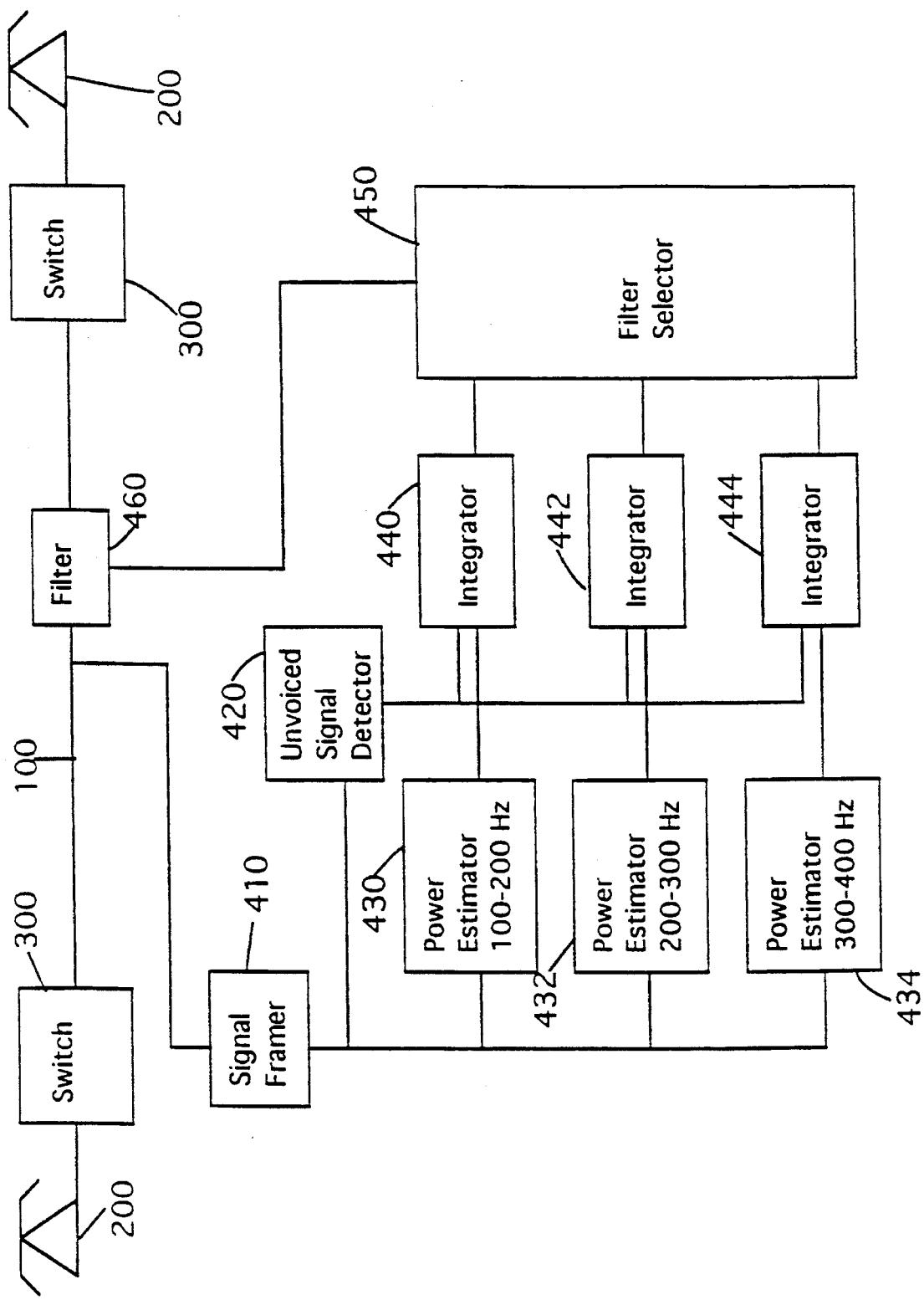
FIG. 1 is a block schematic diagram of a voice channel compensation arrangement according to an embodiment of the invention.

FIG. 1 is a block schematic diagram of an arrangement according to an embodiment of the invention for applying low frequency compensation to a telecommunications channel 100 between two telephone station sets 200, the channel 100 being established by digital switches 300 of a switched network.

The low frequency compensation arrangement comprises a signal framer 410, an unvoiced signal detector 420, a spectrum analyzer in the form of three narrowband power estimators 430, 432, 434 and three integrators 440, 442, 444, a filter selector 450, and a filter 460.

The signal framer 410 taps into the channel 100 at a convenient point in the switched network, for example at a trunk interface in a toll office. The signal framer 410 includes a buffer and control circuitry which serially copies digital signals carried on the channel 100 into the buffer. When the buffer is full, the control circuitry passes the buffer contents in parallel to the unvoiced signal detector 420 and to each of the three narrowband power estimators 430, 432, 434. Consequently, the signal framer 410 divides digital signals carried on the channel 100 into signal segments of limited duration. The buffer size is selected such that the signal segments have a duration of approximately 10 milliseconds.

A first power estimator 430 employs known digital signal processing techniques to estimate the power between 100 Hz and 200 Hz for each signal segment. The power estimates are fed to a first leaky integrator 440 which integrates the power estimates over time to derive time-averaged power measurements of a spectral component between 100 Hz and 200 Hz.

The unvoiced signal detector 420 employs known digital signal processing techniques to identify signal segments that contain only unvoiced signals. The unvoiced signal detector 420 controls the first integrator 440 such that it integrates the power estimates supplied by the first power estimator 430 for those signal segments that contain only unvoiced signals. In particular, the speech detector 420 controls the first integrator 440 such that it has an integrating characteristic defined by:

$$P_i = \beta p_i + (1-\beta) P_i - 1$$

for unvoiced signal segments, and by:

$P_i = P_i - 1$ for voiced signal segments, where:

$P_i$ is the time-averaged power estimate for the $i^{th}$ segment,
$\beta$ is a leakage factor of the integrator, $0<\beta<1$, and
$p_i$ is the power estimated for the $i^{th}$ segment.

The factor $\beta$ is selected so that the integrator has a time constant of approximately 1 second.

Consequently, the first integrator 440 derives a time-averaged measurement of a spectral component between 100 Hz and 200 Hz of signal segments on the channel 100 which contain no voiced speech signals, i.e. a time-averaged measurement of a spectral component between 100 Hz and 200 Hz of unvoiced speech signals and noise on the channel 100.

Similarly, a second power estimator 432 estimates the power in each signal segment between 200 Hz and 300 Hz, and a second leaky integrator 442 controlled by the unvoiced signal detector 420 integrates the power estimates for only the unvoiced signal segments. Consequently, the second integrator 442 derives a time-averaged measurement of a spectral component between 200 Hz and 300 Hz of unvoiced speech signals and noise on the channel 100.

Similarly, a third power estimator 434 and a third leaky integrator 444 controlled by the speech detector 420 derive a time-averaged measurement of a spectral component between 300 Hz and 400 Hz of unvoiced speech signals and noise on the channel 100.

Figure 2A:
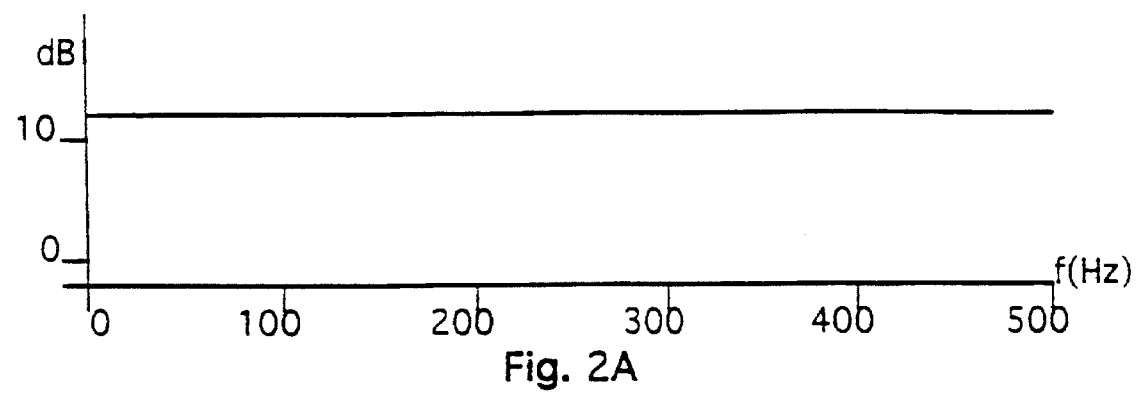
FIGS. 2A, 2B, 2C and 2D are a series of plots illustrating the operation of the voice channel compensation arrangement of FIG. 1.

The spectral characteristics of unvoiced speech and noise from various sources have been studied in considerable detail. Unvoiced speech signals and ambient acoustic noise would normally be expected to have a fairly flat spectrum between 0 Hz and 500 Hz as illustrated in FIG. 2A. However, the frequency response of the telecommunications channel 100 (including the frequency response of the transmitter of the sending telephone station set 200) preferentially attenuates frequencies below 300 Hz in many actual telephone networks, so that the measured unvoiced speech and noise spectrum is similar to that shown in FIG. 2B.

Figure 2B:
Figure 2C:
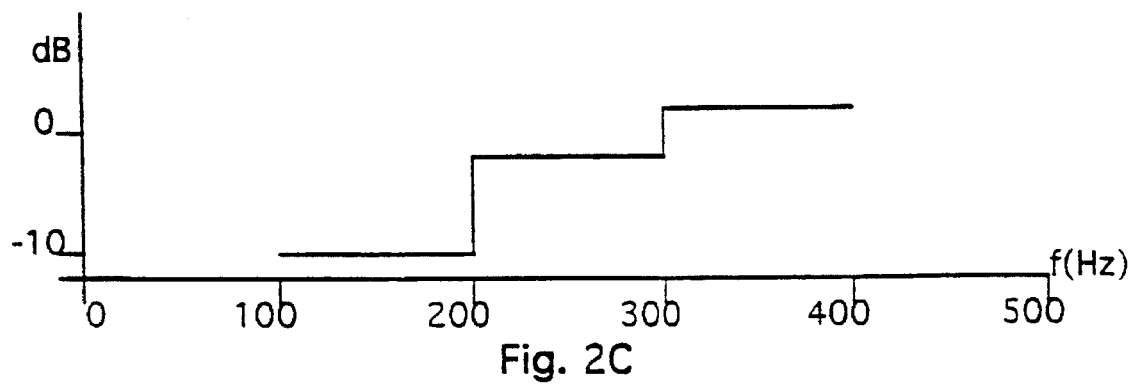
Figure 2D:
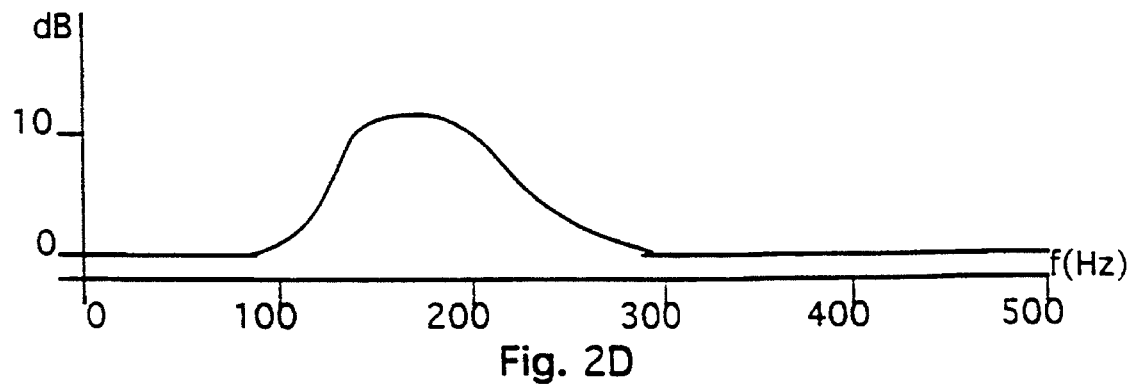

The filter selector 450 compares the time-averaged measurements of the three spectral components of unvoiced speech and noise on the channel 100 (e.g. as shown in FIG. 2B) to an expected unvoiced speech and noise spectrum (e.g. as shown in FIG. 2A) to estimate the frequency response of the channel 100 between 100 Hz and 400 Hz (as shown in FIG. 2C). The filter selector 450 applies decision criteria based on the estimated frequency response to determine the level of low frequency compensation (if any) that should be provided. In the example illustrated in FIGS. 2A, 2B and 2C, the filter selector 450 may select a filter characteristic as illustrated in FIG. 2D.

The filter selector 450 inserts a filter 460 having the selected filter characteristics into the channel 100 to boost the low frequency response of the channel 100. The filter 460 may be selected from a bank of filters by a switching operation controlled by the filter selector 450, or may be a programmable filter having filter characteristics which are programmable in response to control signals from the filter selector 450. For example, the filter 460 may be implemented in a digital signal processor of a trunk interface, an echo cancellor or another network resource that would normally include a digital signal processor and would form part of the channel 100 between telephone station sets 200.

In a relatively simple embodiment, the filter 460 may have a single fixed compensation characteristic, and the filter selector 450 may merely decide whether or not to insert the filter 460 into the channel 100 in response to the estimated frequency response of the channel 100. For example, the single filter characteristic may be as illustrated in FIG. 2D, and the filter selector 450 may insert the filter 460 whenever the time-averaged estimate of the spectral component between 100 Hz and 200 Hz is at least 10 dB below the time-averaged estimate of the spectral component between 300 Hz and 400 Hz, and the time-averaged estimate of the spectral component between 200 Hz and 300 Hz is at least 4 dB below the time-averaged estimate of the spectral component between 300 Hz and 400 Hz. If either of these conditions are not met, the filter 460 is not inserted in the channel 100 to avoid overcompensation.

In more complex embodiments, several alternative filter characteristics may be provided, and the filter selector 450 may select the filter characteristics which are most appropriate in view of the estimated frequency response of the channel 100. For example, the filter selector 450 may compute the compensated frequency response resulting from the application of each available filter characteristic. The filter selector 450 may then eliminate those filter characteristics which would provide a compensated frequency response with a peak between 100 Hz and 300 Hz which is more than 3 dB above the response between 300 Hz and 400 Hz. The filter selector 450 may then select from the remaining filter characteristics the filter characteristic which provides the best mean square fit to a compensated frequency response which is flat between 100 Hz and 400 Hz.

The filter characteristics need not exactly compensate for the frequency response of the channel 100 to provide an appreciable improvement in voice quality. For example, the filter characteristics illustrated in FIG. 2D would not exactly compensate for frequency response illustrated in FIG. 2C, but would nonetheless be expected to improve the perceived quality of voice signals transmitted over the voice channel 100.

If unvoiced speech and noise on the channel 100 has a spectrum which deviates significantly from the assumed unvoiced speech and noise spectrum, the derived frequency response will be inaccurate. For example, if the originating station set 200 is located near heavy machinery, there may be an unusual amount of low frequency background noise on the channel 100. The measured spectral components will then be greater at low frequencies than shown in FIG. 2B, and the derived frequency response for the channel 100 will then appear flatter at low frequencies than shown in FIG. 2C. Consequently, the selected filter characteristic would provide less low frequency emphasis than shown in FIG. 2D. While the compensation would not then accurately reflect the true frequency response of the channel 100, it would still be advantageous since it would serve to de-emphasize the low frequency noise generated by the machinery in favour of higher frequency components of speech signals.

In the embodiments described above, the spectrum of unvoiced speech signals and noise on the channel 100 is assumed to be flat from 100 Hz to 400 Hz as illustrated in FIG. 2A. While this is believed to be a reasonable approximation for most voice channels, more accurate estimations of the channel frequency response could be derived using more accurate models of the spectra of unvoiced speech signals and noise on the channel 100.

The signal framer 410, unvoiced signal detector 420, power estimators 430, 432, 434, integrators 440, 442, 444 and filter selector 450 may be implemented in a digital signal processor. This digital signal processor may be connected to the channel 100 as the channel 100 is established to select appropriate filter characteristics. The digital signal processor may then be disconnected from the channel 100 while the same filter characteristics are maintained as long as the channel 100 is established. Alternatively, the digital signal processor may remain connected to the channel 100 as long as it is established to dynamically alter the filter characteristics as appropriate in response to changing noise or frequency response characteristics of the channel 100.

The arrangement described above measures the frequency response of the channel 100 and provides compensation only in a low frequency region of the channel 100. The arrangement could be adapted to measure the frequency response and provide compensation in other frequency bands instead of, or in addition to, the low frequency region described above.

These and other variations of the embodiment described above do not depart from the principles of the invention, the scope of which is defined by the claims below.

We claim:

1. A method for estimating a frequency response of a telecommunications channel, comprising:
   dividing a signal carried on the channel into a plurality of signal segments of limited duration;
   identifying unvoiced signal segments; and
   measuring spectral components of the unvoiced signal segments.

2. A method as defined in claim 1, further comprising integrating the measured spectral components over time to derive time-averaged measurements of the spectral components.

3. A method as defined in claim 1, further comprising comparing the measured spectral components to corresponding spectral components of an expected unvoiced signal spectrum.

4. A method as defined in claim 2, further comprising comparing the time-averaged measurements of the spectral components to corresponding components of an expected unvoiced signal spectrum.

5. A method as defined in claim 1, further comprising selecting filter characteristics in response to the measured spectral components.

6. A method as defined in claim 5, further comprising inserting a filter in the channel, the filter having the selected filter characteristics.

7. Apparatus for estimating a frequency response of a telecommunications channel, comprising:
   a signal framer for dividing a signal carried on the channel into a plurality of signal segments of limited duration;
   an unvoiced signal detector for identifying unvoiced signal segments; and
   a spectrum analyzer for measuring spectral components of the unvoiced signal segments.

8. Apparatus as defined in claim 7, wherein the spectrum analyzer comprises:
   a plurality of band limited power estimators, each power estimator being operable to estimate signal power in a corresponding frequency band; and
   a plurality of integrators, each integrator being connected to a corresponding power estimator and operable to integrate signal powers estimated by the corresponding power estimator.

9. Apparatus as defined in claim 7, wherein the unvoiced signal detector is operably connected to the spectrum analyzer to control the spectrum analyzer such that the integrators integrate estimated signal powers of only unvoiced signal segments.

10. Apparatus as defined in claim 9, wherein the unvoiced signal detector controls the spectrum analyzer such that each integrator has an integrating characteristic defined by:

$$P_i = \beta p_i + (1-\beta) P_i - 1$$

for unvoiced signal segments, and by:

$$P_i = P_i - 1$$

for voiced signal segments, where:
   $P_i$ is the time-averaged power estimate for the $i^{th}$ signal segment,
   $\beta$ is a leakage factor of the integrator, $0 < \beta < 1$, and
   $p_i$ is the power estimated for the $i^{th}$ signal segment.

11. Apparatus as defined in claim 10, wherein the signal framer is a buffer operable to divide the signal into segments of approximately 10 millisecond duration, and the integrators have a time constant of approximately 1 second.

12. Apparatus as defined in claim 7, further comprising a filter selector for selecting filter characteristics in response to the measured spectral components.

13. Apparatus as defined in claim 12, further comprising a filter for insertion into the channel in response to a control signal issued by the filter selector.

14. Apparatus as defined in claim 12, further comprising a programmable filter for insertion into the channel, the programmable filter having filter characteristics selectable in response to control signals issued by the filter selector.

15. A method for estimating a frequency response of a telecommunications channel, comprising:
   dividing a signal carried on the channel into a plurality of signal segments of limited duration;
   identifying signal segments containing only noise-like signals; and
   measuring spectral components of the identified signal segments.

16. A method as defined in claim 15, further comprising integrating the measured spectral components over time to derive time-averaged measurements of the spectral components.

17. A method as defined in claim 16, further comprising comparing the time-averaged measurements of the spectral components to corresponding components of an expected spectrum for noise-like signals.

18. A method as defined in claim 15, further comprising selecting filter characteristics in response to the measured spectral components.

19. A method as defined in claim 18, further comprising inserting a filter in the channel, the filter having the selected filter characteristics.

20. The method recited in claim 1 further comprising estimating the frequency response of the telecommunications channel from the spectral components of the unvoiced signal segments.

21. The method recited in claim 15 further comprising estimating the frequency response of the telecommunications channel from the spectral components of the identified signal segments.

22. The apparatus recited in claim 7 wherein said spectral components of the unvoiced signal segments provide an estimate of the frequency response of the telecommunications channel.

* * * * *